ated Dec. 30, 1958

2,866,507
GAS DRIVE OIL RECOVERY PROCESS

Donald C. Bond and Orrin C. Holbrook, Crystal Lake, Ill., assignors to The Pure Oil Company, Chicago, Ill., a corporation of Ohio No Drawing. Application December 24, 1956
Serial No. 630,087

9 Claims. (Cl. 166—9)

This invention relates to the recovery of petroleum oil from partially depleted oil-bearing reservoirs. It is more specifically concerned with improving the efficiency of gas-drive secondary recovery processes.

In secondary recovery processes involving the injection of a drive fluid, such as gas or water, into a partially depleted, oil-bearing reservoir, the capillarity and surface tension characteristics of the reservoir are important factors in determining the efficiency of the recovery process. To recover the residual oil from the reservoir, it is necessary that the equilibrium condition which exists between the reservoir and its fluid contents be disturbed. This generally can be effected by modifying the interfacial tension relationships which exist among the various phases, e. g., gas, oil, water and solid mineral surfaces, present in the reservoir. For effecting the interfacial tension modifications of the reservoir and/or changing the wettability of the interstitial surfaces in the reservoir, various surface-active chemicals have been incorporated in the injection waters employed in water-flooding a partially depleted reservoir. The results of published investigations have indicated that the presence of surface-active agents in the flood water will improve the oil recovery and increase the efficiency of oil production carried out in this manner. Frequently, it is desirable when initiating secondary recovery processes to use gas-injection methods because they do not damage the reservoir. This permits, after gas injection has been discontinued, the use of other methods of secondary recovery, if necessary, to complement the effect of gas injection. In a conventional gas drive, the mobility of the injected gas is very much greater than the mobility of the oil in the formation. In flowing through the formation, the gas by-passes large quantities of oil, and gas breakthrough from injection well to producing well occurs at a relatively high oil saturation in the formation. Thereafter, the ratio of injected gas to produced oil increases rapidly while the oil saturation in the formation decreases slowly. At the time the gas-drive reaches its economic limit, a large amount of oil remains in the formation which cannot be produced because of the uneconomically high gas/oil ratio that would be required. Heretofore, the use of surface-active agents in gas injection has not been deemed advantageous because of the mechanism of this type of recovery process. It has been found, however, that the use of certain surface-active agents in gas-drive, secondary recovery processes provides beneficial results.

The principal object of this invention, therefore, is to enhance the effectiveness of a gas-drive, secondary recovery process employed in stimulating residual oil recovery from subterranean oil reservoirs by carrying out the gas-drive in the presence of surface-active agents. It is another object of this invention to employ surface-active agents having foam-producing characteristics in gas-drive secondary recovery methods. These and other objects will become apparent from the following detailed description of this invention.

In accordance with the present invention, a water-soluble surface-active agent having foam-producing characteristics is employed in artificially injecting gas which flows through the interstitial passages of a reservoir rock from an injection well to a recovery well. The residual oil contained in the reservoir is carried along, or driven ahead of, the injected gas by carrying out the gas injection in the presence of a suitable surface-active agent. The efficiency of the gas injection is increased and the oil recovery improved. In order to enhance the efficiency of gas-drive, secondary recovery processes, it is necessary to employ a water-soluble surface-active agent which has foam-producing tendencies. Examples of surface-active agents which can be used in carrying out this invention include water-soluble, unsaturated quaternary amines having 8–20 carbon atoms in the longest chain, e. g., dimethyl didodecenyl ammonium chloride, methyl trioctenyl ammonium iodide, trimethyl decenyl ammonium chloride, dibutyl dihexadecenyl ammonium chloride; water-soluble salts of esters of $C_3$–$C_6$ sulfo dicarboxylic acids having the general formula

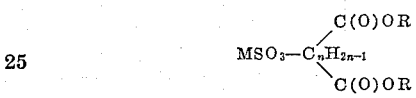

where M is a substituent forming a water-soluble salt, such as alkali metals, ammonium, and substituted ammonium, R is $C_3$–$C_{16}$ alkyl substituent, and $n$ is an integer from 1–4, e. g., monosodium dioctyl sulfosuccinate, ammonium dilauryl sulfosuccinate, monosodium dibutyl sebacate, monosodium diamyl sulfoadipate; and others; and water-soluble perfluoroalkanoic acids and salts thereof having 3–24 carbon atoms per molecule e. g., perfluorooctanoic acid, perfluoropropanoic acid, perfluorononanoic acid, etc.

In U. S. Patent 2,765,851, D. C. Bond, one of the inventors of the instant invention, describes and claims the use of fluorocarbons in enhancing the efficiency of secondary recovery processes for recovering hydrocarbon fluids from siliceous, subterranean reservoirs. It was found that the objectives of the invention were effected by the ability of the fluorocarbons to be absorbed by the interstitial surfaces and render them oleophobic and hydrophobic. In the instant invention the perfluoroalkanoic acids or their salts, as well as the other hereinbefore mentioned surface-active agents, are employed as selective foaming agents to produce a suitable gas-in-liquid dispersion in the reservoir. To function in this manner the adsorption of the foaming agent by the formation surfaces must be minimized to avoid its loss, which is best avoided by contacting the aqueous "slug" of the foaming agent initially introduced into the formation without delay with the gas drive fluid to utilize the foaming agent in the production of the foam. In other words, there must exist in the formation conditions conducive to the production of foam which include not only the use of the selective foaming agents but also sufficient water to produce a stable gas-in-water dispersion or foam which increases the effectiveness of the gas drive. Generally sufficient water is present in the form of connate, formation water. In this instance the foaming agent can be introduced by dispersing it in the gas drive fluid when the connate water saturation is above 30%. Formation conditions exist, however, wherein water must be introduced into the formation in amounts sufficient to permit the formation of the desired gas-in-water foam, viz, about 1 to 20% of the pore volume of the formation being treated. Accordingly, to insure the production of foam, and facilitate the introduction of the foaming agent, it is preferred whether connate water is present or not, to introduce the selective foaming agent in the form of a slug of water having the desired amount of foaming agent in solution therein. The amount of water-soluble surface-active agent having foaming characteristics will depend upon a number of factors such as size of the formation. In general, the amount employed will depend on the amount of connate water or added water in that portion of the reservoir to be gas-driven. Sufficient surfactant is added to produce a concentration of 0.001 to 1%, assuming uniform concentration throughout the quantity of water present during the gas-drive. As pointed out above, in utilizing the selective foaming agent in the recovery process, it is preferred that a concentrated aqueous solution of the agent be introduced into the formation prior to the gas injection. Thereafter the gas-drive is started. The injected gas in being forced through the aqueous solution will produce a foam front between the injected gas and the reservoir fluids which greatly reduces the mobility of the gas phase and increases the displacing ability of the injected gas. Other methods of introducing surfactant include introducing the foaming agent, either concentrated or as a concentrated aqueous solution, in the form of a fog or mist suspended in the injected gas. The gas-drive process employed in the subject invention is carried out using conventional gas injection practice as set forth in Petroleum Production Engineering—Exploitation, 3rd edition, Uren, McGraw-Hill at page 492–504. Injection gases which can be employed include natural gas, air, flue gases, exhaust gases from internal combustion engines or other inexpensive gases. Sources of gas for gas injection projects are also discussed in Petroleum Production Engineering, cited supra, at page 475–8.

Because of the foaming which is induced, it may be necessary to employ methods for breaking the gas-oil emulsion which is formed in the producing well in order to permit the oil which is recovered to be readily pumped from the recovery well. This problem can be corrected by introducing into the recovery well small amounts of defoamants. For example, U. S. Patent 2,585,522 describes the use of dihydrocarbon silicones and silicates; however, other suitable defoamants can be employed for resolving crude oil froth which is produced in the recovery well.

The advantages which are derived from the use of foam-producing, surface-active agents in enhancing the efficiency of secondary recovery processes are illustrated by the results of the following investigation. In this investigation a glass tube 30 cm. x 1.25 cm. was filled with 50–70 mesh sand. The sand was saturated with distilled water and it was determined that the average pore volume was 16.0 ccs. About 2 pore volumes of a synthetic crude oil, prepared by blending equal parts of volume of a petroleum naphtha having the following characteristics:

Boiling range _____ °F.___ 300–400
Gravity _____ ° API__ 48.9 with a white oil having the following characteristics:

Density _____ 0.83 to 0.86
Boiling range _____ ° F. __ >680 was then passed through the column. The volume of water displaced was assumed to be equal to the volume of oil which was retained in the column. In order to establish an initial gas saturation 100 ccs. of air was passed into the oil-saturated column. During the gas saturation only a small amount of oil was forced from the column. A small portion, viz., 1 cc. of a 1% aqueous solution of a selected surface-active agent was then injected into the column and a drive gas, e. g., air, was passed through the simulated oil-bearing reservoir. The results of this investigation are summarized in Table I.

*Table 1*

Surface active agent:            Recovery volume, percent
None _____ 47
Polyoxymethylene esters of mixed fatty acid and resin esters (Renex) _____ 42
Bis (5,5,7,7-tetramethyl 2 octenyl) dimethyl ammonium chloride _____ 52
Mixed quaternary ammonium chlorides [1]_____ 40
Perfluorooctanoic acid _____ 58
Sodium dioctylsulfosuccinate _____ 54

[1] A proprietary composition consisting of alkyl trimethyl ammonium and dialkyl dimethyl ammonium chlorides having a molecular weight of 480 and containing the following alkyl constituents: octadecyl, dodecyl, tetradecyl, hexadecyl, and octyl.

From the several oil recoveries which are reported in Table I, it is seen that increases in oil recovery are obtained only with specific surface-active agents. This specificity is further illustrated by additional experiments in which oil-soluble surface-active agents were employed. In this instance, no increase in the oil recovery was obtained.

Other experiments were also carried out in a glass column 30 inches long and with a ½" I. D. As in the foregoing experiments, the column was packed with 50–70 mesh sand. Formation conditions were simulated by saturating the column of sand with water. Thereafter, about 5 pore-volumes of a synthetic crude oil, prepared as above, were passed through the column to effect its oil saturation. A gas phase was then introduced by passing 750 ccs. of gas through the sand column. A small amount of water, viz., 2 cc., was introduced into the column and an additional 250 cc. of drive gas injected. The injection of the water had no beneficial effect on the recovery, and the oil recovery produced by passing 500 cc. of gas through the column was 44 volume %. In a similar experiment 2 cc. of a 1% aqueous solution of sodium dioctylsulfosuccinate was substituted for the water employed in the above experiment. After about 250 cc. of gas had passed through the sand column, another 2 cc. of a 1% aqueous solution of sodium dioctylsulfosuccinate was introduced in the column and driven with another 250 cc. of gas. After the total of 500 cc. of gas injection, the oil recovery carried out employing sodium dioctylsulfosuccinate as a foam-producing surface-active agent was 70%. These experiments clearly demonstrated the increased production which is obtained by employing foam-producing, water-soluble, surface-active agents in conjunction with gas-drive, secondary recovery processes. Although it is pointed out in the prior art that the residual oil recovered by gas-drive processes moves within the reservoir in the form of expanding gas bubbles which assist in oil expulsion, it has been observed that such gas-oil formations, mechanically produced without employing the foaming agent of this invention, are very unstable and disintegrate rapidly. In addition, reservoir conditions may be such that gas-oil foams will not be produced, or if they should form, they will not be developed within the desired zone in the producing formation. By employing the instant invention, however, very stable tenacious foams are produced and these foams are formed at the gas-drive-oil interfaces where they will be most effective. Accordingly, we claim as our invention:

1. In stimulating the recovery of residual petroleum oil from a partially depleted, subterranean reservoir by means of a gas drive wherein a gas is forced through the reservoir from an injection well to a recovery well, the method of increasing the efficiency of the gas drive which comprises disposing in the reservoir adjacent said injection well a dilute non-viscous aqueous solution containing sufficient amounts of water having incorporated therein a water-soluble, foaming agent having foam-producing characteristics in an amount sufficient to produce a stable gas-in-water foam at the drive gas-residual oil interface produced during said gas-drive and immediately thereafter forcing said gas into said reservoir in contact with said solution whereby the adsorption of said foaming agent by said reservoir is substantially avoided and there is produced a stable gas-in-water foam bank ahead of the gas-drive interface.

2. A method in accordance with claim 1 in which the water-soluble, surface-active agent is selected from the group consisting of water-soluble, unsaturated quaternary amines having 8-20 carbon atoms in the longest chain, water-soluble salts of esters of $C_2$-$C_6$ sulfo dicarboxylic acids having the general formula:

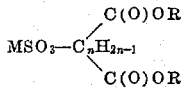

where M is a substituent forming a water-soluble salt and $n$ is an integer from 1 to 4, and water-soluble perfluoroalkanoic acids and salts thereof having 3-24 carbon atoms per molecule.

3. A method in accordance with claim 2 in which said aqueous solution contains 0.001-1 wt. percent of said foaming agent.

4. A method in accordance with claim 3 in which said foaming agent is perfluoroalkanoic acid having 3-24 carbon atoms per molecule.

5. In stimulating the recovery of petroleum oil from a partially depleted, subterranean reservoir by means of a gas-drive wherein a gas is forced through the reservoir from an injection well to a recovery well, the method of increasing the efficiency of the gas-drive which comprises introducing into the reservoir adjacent said injection well 1 to 20 vol. percent, based on the pore volume of said reservoir, of an aqueous solution containing therein 0.001 to 1 wt. percent, based on said solution, of a water-soluble, foaming agent having foam-producing characteristics, and immediately thereafter forcing said gas into said reservoir in contact with said solution whereby the adsorption of said foaming agent by said reservoir is substantially avoided and there is produced a stable, gas-in-water foam bank ahead of the gas-drive interface.

6. A method in accordance with Claim 5 in which the foaming agent is selected from group consisting of water-soluble, unsaturated quaternary amines having 8-20 carbon atoms in the longest chain, water-soluble salts of esters of $C_2$-$C_6$ sulfo dicarboxylic acids having the general formula:

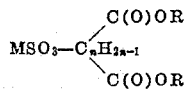

where M is a substituent forming a water-soluble salt and $n$ is an integar from 1 to 4, and water-soluble perfluoroalkanoic acids and salts thereof having 3-24 carbon atoms per molecule.

7. A method in accordance with claim 5 in which said foaming agent is a $C_3$-$C_{24}$ perfluoroalkanoic acid.

8. A method in accordance with claim 7 in which said alkanoic acid is perfluorooctanoic acid.

9. In stimulating the recovery of petroleum oil from a partially depleted subterranean reservoir containing substantial amounts of connate water by means of a gas-drive wherein a gas is forced through the reservoir from an injection well to a recovery well, the method of increasing the efficiency of the gas-drive which comprises introducing into the reservoir a drive gas having dispersed therein a water-soluble, foaming agent having foam-producing characteristics, in an amount sufficient to produce a concentration of 0.01-0.001% of foaming agent in said connate water, forcing said gas into said reservoir in contact with connate whereby there is produced a foam bank ahead of the gas-drive interface.

References Cited in the file of this patent

UNITED STATES PATENTS

| | | |
|---|---|---|
| 1,658,305 | Russell | Feb. 7, 1928 |
| 2,341,500 | Detling | Feb. 8, 1944 |
| 2,469,354 | Bond | May 10, 1949 |
| 2,670,801 | Sherborne | Mar. 2, 1954 |